No. 855,106. PATENTED MAY 28, 1907.
E. HENSEL.
FLEXIBLE LINK SHAFT.
APPLICATION FILED JAN. 31, 1906.
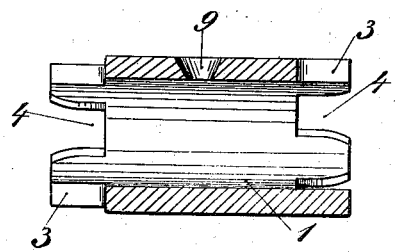
Fig. 2.
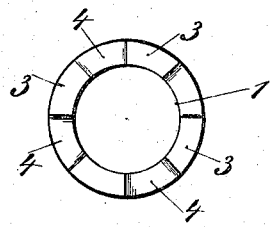
Fig. 3.
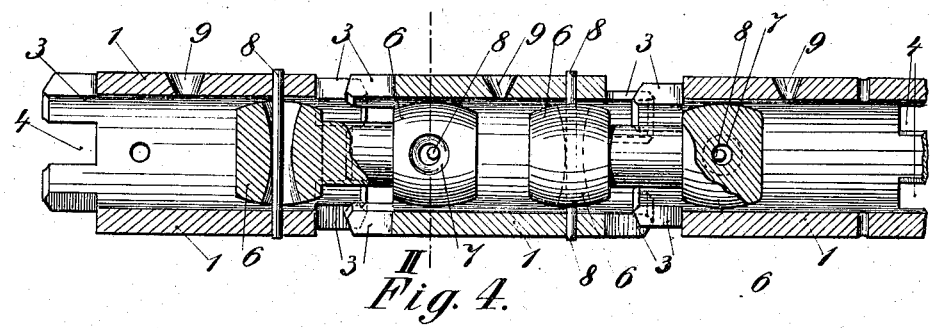
Fig. 4.
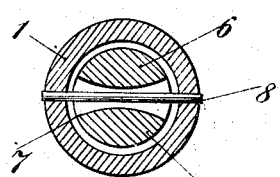
Fig. 5.
Witnesses:
Adalbert Müller
Harold Baron.
Inventor:
Emil Hensel.

UNITED STATES PATENT OFFICE.

EMIL HENSEL, OF BERLIN, GERMANY.

FLEXIBLE LINK-SHAFT.

No. 855,106.     Specification of Letters Patent.     Patented May 28, 1907.

Application filed January 31, 1906. Serial No. 298,806.

*To all whom it may concern:*

Be it known that I, EMIL HENSEL, proprietor of a factory, a subject of the German Emperor, and a resident of 34 Görlitzer Ufer, Berlin S. O., Germany, have invented certain new and useful Improvements in and Relating to Flexible Link-Shafts, of which the following is a specification.

Flexible shafts are known consisting of sections connected by transverse pins at their ends, and of links adapted to be connected to one another in the form of an interlocking ball-and-socket joint, and of tubular links connected with one another by means of suitably arranged bolts. Such flexible shafts are qualified to transmit motion and small mechanical power.

The present invention consists of a flexible link shaft by means of which large mechanical power may be transmitted even with a small number of revolutions, an alternating direction of these revolutions being of no influence. In order to attain this result I apply tubular links respectively connected and provided with teeth on their faces. The teeth of said links fit each other but the teeth of one link do not quite reach the bottom of the cuttings between the opposite teeth of the adjoining link.

It is very important to make the lateral faces of the teeth very broad in order to directly transmit during the rotation of the shaft the motion of one link to the other and hereby to also transmit the mechanical power. The teeth of the succeeding links are arranged in steps in order to facilitate the transmission of power.

The connections of the single links may be effected by differently constructed means, but they must be under all conditions of such a construction that the teeth can not come out of gear. The links may be connected by bolts with ball formed heads, each head provided with a passage for a pin passing through the walls of the link and through said head. The passages through the two heads may preferably be bored at right angles to each other and conically enlarged toward their ends in order to allow a free motion of the links in all directions.

The distinguishing feature of the present invention is that the power or motion is transmitted by the tubular links, whereas the bolts merely serve to connect the links and keep them in such a position that the teeth of one link may engage the teeth of the next one.

The accompanying drawing illustrates one construction of the flexible link-shaft, in which like letters refer to like parts throughout the different views.

Figure 1 shows a front-view of the flexible link-shaft. Fig. 2 shows a longitudinal section through one link of the shaft. Fig. 3 shows the front face of a link. Fig. 4 shows a longitudinal section through two links and connected directly by a bolt. Fig. 5 shows a vertical section on line II—II Fig. 4.

The flexible shaft comprises the links 1 which are added one to the other in any desired number. The end-links 2 carry on one end, and the intermediate links 1 on both ends the teeth 3, coöperating with each other whereby the ends of the teeth 3, do not quite touch the bottom of the cuttings 4. The teeth 3 of one link succeeding the teeth of another link are arranged in staggered relation, as shown in Fig. 1, to facilitate the transmission of power.

The teeth 3 are provided with broad lateral faces as shown in Figs. 2 and 3. The teeth of one link exactly fit the teeth of the next link, and large mechanical forces may be transmitted. These joints of the links allow the shaft to be rotated, if desired, in either direction, without showing any effect on the transmitting of the mechanical power or movement.

Fig. 4 shows the links connected by a bolt 5 provided on both ends with ball-formed heads 6, directly and pivotally connected to the links 1. The heads 6 are provided with holes 7, the holes being preferably bored at right angles to each other to allow a free movement in all directions. The pins 8 are passed through the holes 7 of the links 1. 9 is a hole for the oiling of the inner mechanism.

The number of the links joined together and the number of the teeth provided on the faces of said links may be of any desired number without exceeding the scope of my invention. The joining of the links may be effected in any desired way, but important and essential features of my flexible shaft are that the teeth of the links have broad lateral faces and that the joints are so chosen, that they allow a free motion in all directions.

What I claim as new and desire to secure by a United States Letters Patent is:

1. In a flexible link shaft the combination of a number of tubular links, teeth being provided on the adjoining faces of said links, the teeth of succeeding links being in staggered relation, said teeth having broad lateral faces for transmitting motion and force of one link to the next, bolts inserted into and connecting said links said bolts being provided with ball-formed heads having holes, pins passing through said holes, said pins being firmly connected to the links, all substantially as set forth.

2. In a flexible link shaft the combination of a number of tubular links, teeth being provided on the adjoining faces of said links, the teeth of succeeding links being in staggered relation, said teeth having broad lateral faces adapted to transmit motion and force from one link to the next, bolts inserted into and connecting said links, said bolts being provided with ball-formed heads having holes, said holes being conically enlarged from the center of the head to the outside, pins passing through said holes, said pins being firmly connected to the links, all substantially as set forth.

In testimony whereof I have hereunto signed my name this 13th day of January 1906, in the presence of two subscribing witnesses.

EMIL HENSEL.

Witnesses:
 WOLDEMAR HAUPT,
 HENRY HASPER.